US012650791B1

(12) United States Patent
Liu et al.

(10) Patent No.: US 12,650,791 B1
(45) Date of Patent: Jun. 9, 2026

(54) STORAGE-MEMORY FUSION DRIVE WITH DIRECT PROCESSOR-STORAGE ACCESS DATA PATH

(71) Applicant: ScaleFlux, Inc., Milpitas, CA (US)

(72) Inventors: Yang Liu, Milpitas, CA (US); Jiangpeng Li, San Jose, CA (US); Fei Sun, Irvine, CA (US); Tong Zhang, Albany, NY (US)

(73) Assignee: SCALEFLUX, INC., Milpitas, CA (US)

( * ) Notice: Subject to any disclaimer, the term of this patent is extended or adjusted under 35 U.S.C. 154(b) by 10 days.

(21) Appl. No.: 18/976,958

(22) Filed: Dec. 11, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0683* (2013.01)

(58) Field of Classification Search
CPC .... G06F 3/0659; G06F 3/0604; G06F 3/0644; G06F 3/0683
See application file for complete search history.

(56) References Cited

U.S. PATENT DOCUMENTS

| | | | |
|---|---|---|---|
| 8,631,202 B2 * | 1/2014 | Kim ...................... | G06F 11/108 |
| | | | 711/173 |
| 2015/0160862 A1 * | 6/2015 | Blott .................... | G06F 3/0683 |
| | | | 711/148 |
| 2018/0024777 A1 * | 1/2018 | Higgins ............... | G06F 3/0659 |
| | | | 711/103 |
| 2018/0059955 A1 * | 3/2018 | Moon ................... | G06F 3/0685 |
| 2020/0081834 A1 * | 3/2020 | Desai ................. | G06F 12/0646 |

* cited by examiner

*Primary Examiner* — Shawn X Gu
*Assistant Examiner* — Mohammad S Hasan
(74) *Attorney, Agent, or Firm* — Hoffman Warnick LLC

(57) ABSTRACT

A memory drive and associated method. The memory drive includes: a plurality of solid-state devices (SSDs); a plurality of dynamic random-access memory (DRAM) devices; and a controller configured to implement a data management process. The data management process includes: partitioning the DRAM devices into SSD-domain DRAM having a mapping table and a CXL-domain DRAM having a system memory space that is directly accessible by a host CPU; and processing read requests from the host CPU for data in the SSDs, including writing requested data into the system memory space of the CXL-domain DRAM, and then writing the requested data from the CXL-domain DRAM to the host CPU using a CXL transport protocol.

20 Claims, 13 Drawing Sheets

Fusion drive 40 in combo-NVMe/CXL mode

For both SSD-domain & CXL-domain DRAM
with $C_{DRAM}^{CXL} > 0$

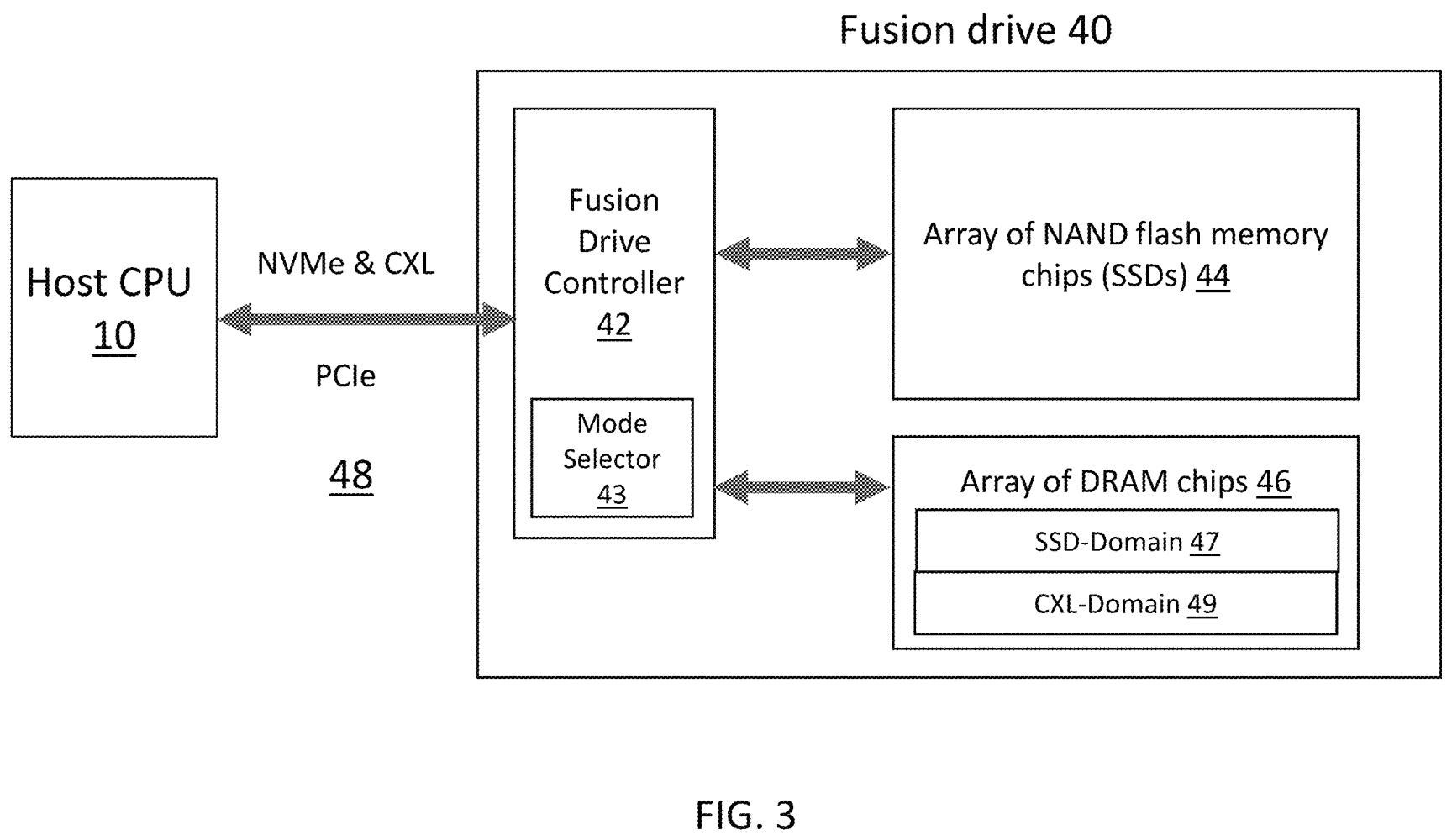

Fusion drive 40

Array of NAND flash memory chips (SSDs) 44

Array of DRAM chips 46

SSD-Domain 47

CXL-Domain 49

Fusion Drive Controller 42

Mode Selector 43

NVMe & CXL

PCIe

48

Host CPU 10

FIG. 3

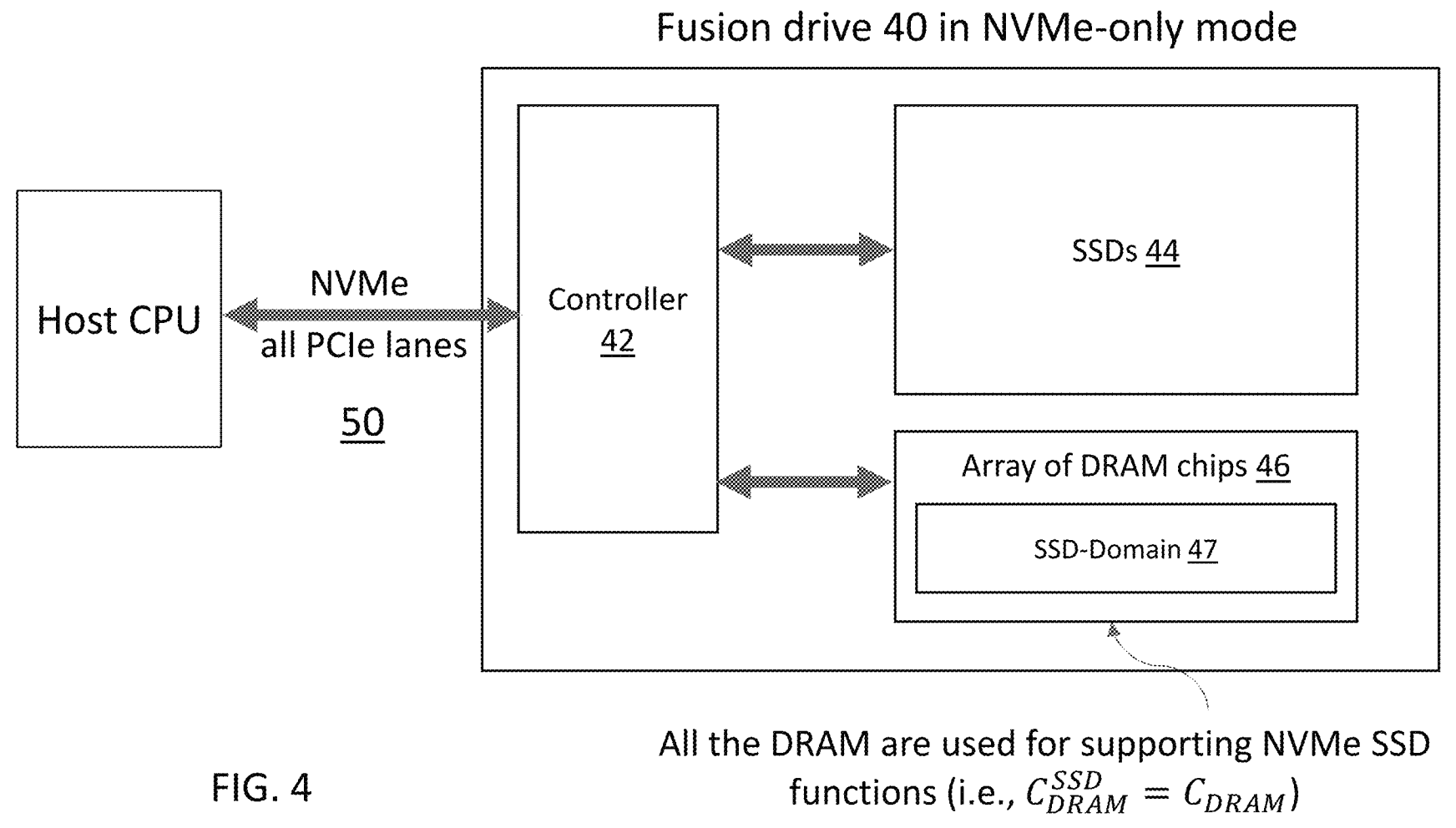

Fusion drive 40 in NVMe-only mode

Host CPU

NVMe
all PCIe lanes
50

Controller
42

SSDs 44

Array of DRAM chips 46

SSD-Domain 47

All the DRAM are used for supporting NVMe SSD functions (i.e., $C_{DRAM}^{SSD} = C_{DRAM}$)

FIG. 4

Fusion drive 40 in combo-NVMe/CXL mode

SSDs 44

Array of DRAM chips 46

SSD-Domain 47

CXL-Domain 49

Controller 42

Mode Selector 43

Host CPU 10

NVMe $l_N$ PCIe lanes 52

CXL $l - l_N$ PCIe lanes 54

For both SSD-domain & CXL-domain DRAM with $C_{DRAM}^{CXL} > 0$

FTL mapping table

Physical location of $m$ consecutive LBAs: $\{LBA_1, LBA_2, \cdots, LBA_m\}$

Physical location of $m$ consecutive LBAs: $\{LBA_{m+1}, LBA_{m+2}, \cdots, LBA_{2m}\}$ one table entry Pick one storage space segment $D_i$ S21 Calculate the metric calculate a metric $\mu = \dfrac{(\alpha_{WA}(m))^{\beta} \cdot V_{write}}{V_{read} + V_{write}}$ $\mu > r_{down}$?

Y — S22 Reconstruct the mapping table $T_i$ by reducing the value of $m$ by a factor of 2

N $\mu < r_{up}$?

Y — S23 Reconstruct the mapping table $T_i$ by increasing the value of $m$ by a factor of 2

N

S24 Keep the value of $m$ intact

STORAGE-MEMORY FUSION DRIVE WITH DIRECT PROCESSOR-STORAGE ACCESS DATA PATH

TECHNICAL FIELD

The present invention relates to the field of solid-state memory and storage, and particularly to enabling host processors to better utilize NAND flash memory.

BACKGROUND

Modern computing systems are increasingly reliant on high-performance data storage and memory technologies to meet the demands of data-intensive applications, such as artificial intelligence (AI), machine learning (ML), real-time analytics, and high-performance computing (HPC). Traditional storage solutions, such as Non-Volatile Memory Express (NVMe) solid-state drives (SSDs or flash memory devices), provide high-speed data access but are typically limited by the need to transfer data to CPU-side memory (DDR DRAM) before the data can be processed by CPU. This intermediate data movement often creates bottlenecks in overall system performance, especially in scenarios that require frequent processing of large-scale SSD-resident data.

Concurrently, the development of the Compute Express Link (CXL) protocol has introduced new opportunities for expanding system memory with high-bandwidth, low-latency access to memory devices beyond traditional CPU-side DDR DRAM. CXL enables direct memory access for CPUs and accelerators, providing a coherent, flexible, and expandable memory space. However, the use of CXL and NVMe technologies in tandem has yet to be fully realized in terms of optimizing direct data transfer between host CPU and SSD, without relying on CPU-side memory.

Existing NVMe storage devices utilize onboard DRAM primarily for caching or storing Flash Translation Layer (FLT) mapping tables, which enhances the speed of flash memory access. However, these devices are limited to operating in a conventional storage role, requiring data to be routed through CPU-side DDR memory for further processing by the host processor. This results in performance inefficiencies and added latency, especially for workloads that demand high-throughput memory access.

SUMMARY

Accordingly, an embodiment of the present disclosure is directed to methods for efficiently implementing storage devices in support of direct CPU and storage data access without consuming CPU-side DRAM bandwidth.

In a first aspect, a memory drive is providing that includes: a plurality of solid-state devices (SSDs); a plurality of dynamic random-access memory (DRAM) devices; and a controller configured to implement a data management process that includes: partitioning the DRAM devices into SSD-domain DRAM having a mapping table and a CXL-domain DRAM having a system memory space that is directly accessible by a host CPU; and processing read requests from the host CPU for data in the SSDs, including writing requested data into the system memory space of the CXL-domain DRAM, and then writing the requested data from the CXL-domain DRAM to the host CPU using a CXL transport protocol.

In a second aspect, a method for implementing a data management process in a memory drive that includes a plurality of solid-state devices (SSDs) and a plurality of dynamic random-access memory (DRAM) devices. The method includes: partitioning the DRAM devices into SSD-domain DRAM having a mapping table and a CXL-domain DRAM having a system memory space that is directly accessible by a host CPU; receiving a read request from a host CPU for data in the SSDs; writing requested data into the system memory space of the CXL-domain DRAM; and writing the requested data from the CXL-domain DRAM to the host CPU using a CXL transport protocol.

BRIEF DESCRIPTION OF THE DRAWINGS

The numerous advantages of the present invention may be better understood by those skilled in the art by reference to the accompanying figures in which:

FIG. 3 illustrates the architecture of a fusion drive, according to embodiments.

FIG. 4 illustrates a fusion drive operating in the NVMe-only mode where NVMe protocol runs on all the PCIe lanes, according to embodiments.

Figure 1:
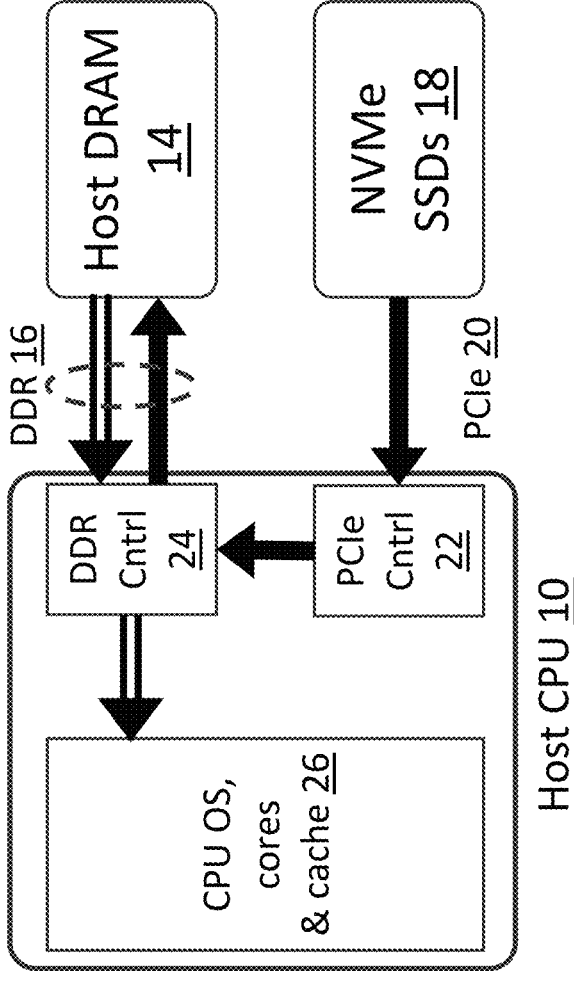
FIG. 1 illustrates that data read from SSDs must be first copied into host DRAM before being processed by the host CPU.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to the presently preferred embodiments of the invention, examples of which are illustrated in the accompanying drawings.

FIG. 1 illustrates a host CPU 10 (also referred to herein as host, host processor(s), CPU, or CPU chip) is coupled with both CPU-managed DRAM modules 14 through DDR channels 16 and (nonvolatile memory express) NVMe solid state drives (SSDs) 18 through Peripheral Component Interconnect Express (PCIe) channels 20 using an NVMe transport protocol. NVMe SSDs 18 provide high-speed access to non-volatile data storage, but their effectiveness is limited by the need to transfer data through CPU-side DDR DRAM (via a PCIe controller 22 and DDR controller 24) before the data can be processed by host processors. This data movement creates performance bottlenecks, particularly in workloads requiring frequent large-scale transfers between storage and memory. As illustrated in FIG. 1, when host CPU 10 needs data from SSDs 18, data are first copied from SSDs 18 into host DRAM 14 that is connected to host CPU via DDR channels 16, and then the data are loaded from host DRAM 14 into host CPU cores, OS, and cache 26 for processing. Moreover, when reading data from SSDs 18, modern operating systems (OS) such as Linux and Windows typically by default first cache the data in operating system (OS) memory space and then copy the data from OS memory space into the user memory space. OS-based I/O data caching introduces more data traffic/movement between host CPU 10 and host DRAM 14. Evidently, such through-host-DRAM I/O data path causes a significant amount of data traffic/movement over host DRAM DDR channels 16, consuming the precious host DRAM 14 bandwidth and hence degrading the overall system speed performance.

Modern computing systems require high-performance storage and memory solutions to meet the demands of data-intensive applications such as artificial intelligence (AI), machine learning (ML), real-time analytics, and high-performance computing (HPC). To address these challenges, a storage device is provided herein that can operate in multiple modes, seamlessly integrating both NVMe storage and Compute Express Link (CXL) memory technologies. Such a solution reduces or eliminates the need for data to traverse through host DRAM 14, effectively reducing latency and increasing overall system memory bandwidth utilization.

Embodiments include a multi-mode PCIe device that integrates both SSDs (e.g., NAND flash memory) and DRAM, capable of supporting both NVMe and CXL transport protocols. The device allows data transfers from NVMe SSD storage to CXL memory, managed entirely by the device controller, without requiring host-side intervention. This enables the host CPU 10 to directly consume SSD bandwidth via CXL, optimizing system performance and overall memory bandwidth utilization.

The advent of the CXL protocol offers new possibilities by enabling direct data access between host CPU 10 and PCIe devices. As a protocol running over physical PCIe lanes, CXL expands system memory beyond traditional host DRAM 14, providing a coherent memory space for CPUs and accelerators.

Figure 2:
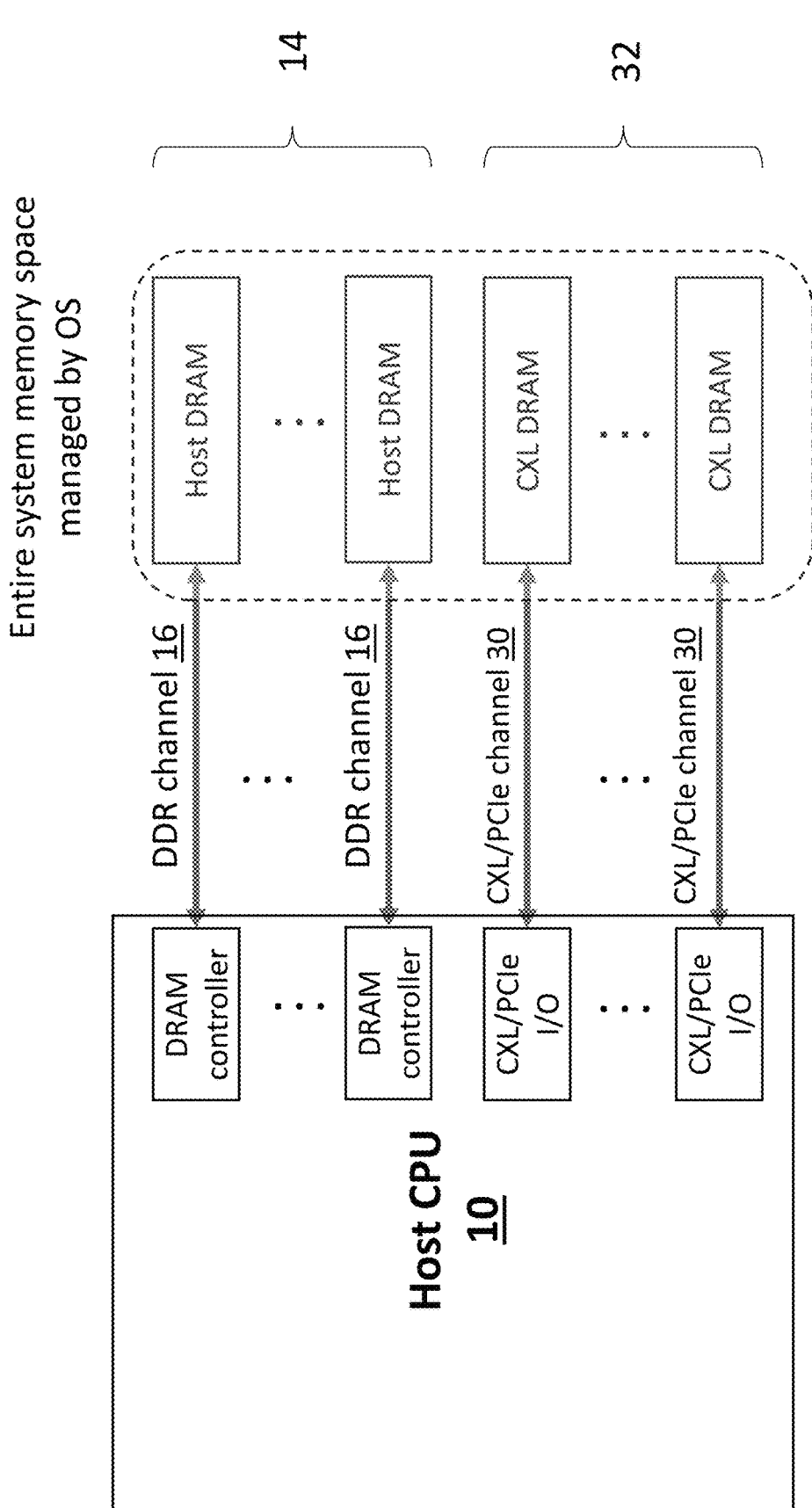
FIG. 2 illustrates a host CPU connecting to both host DRAM through DDR channels and CXL DRAM through CXL/PCIe channels.

As illustrated in FIG. 2, host CPU 10 connects to both host DRAM 14 via DDR channels 16 and CXL DRAM 32 via CXL/PCIe 30, which together form the entire system memory space organized/managed by the OS of the host CPU 10. Modern CPUs can support many PCIe lanes (e.g., 128 PCIe lanes) that have an aggregated bandwidth comparable or even higher than the aggregated bandwidth of host DRAM 14. This invention aims to leverage the emerging CxL ecosystem to largely reduce the usage of host DRAM bandwidth for host CPU accessing/processing SSD-resident data, leaving more host DRAM bandwidth available to other processing and hence improving the overall system speed performance.

To avoid transferring data from SSDs to host DRAM 14, the present approach enables the host CPU 10 to directly load data from SSDs through CXL, without going through host DRAM 14. To address this, a new type of SSD device (referred to herein as a fusion drive) that supports both NVMe and CXL transport protocols is provided.

As illustrated in FIG. 3, fusion drive 40 consists of a fusion drive controller 42 (e.g., implemented on a dedicated chip), an array of SSDs 44 (e.g., NAND flash memory chips), and an array of DRAM chips (DRAM) 46. The controller 42 can communicate with host CPU 10 via both the NVMe transport protocol and CXL transport protocol over the PCIe link. In one embodiment, given the total size-$C_{DRAM}$ DRAM capacity inside one fusion drive 40, the fusion drive controller 42 partitions the DRAM 46 into two domains: (1) SSD-domain DRAM 47 with the capacity of $$C_{DRAM}^{SSD}$$

that is used for managing SSDs and supporting NVMe SSD functions (e.g., storage of an SSD FTL (flash translation layer) mapping table); and (2) CXL-domain DRAM 49 with the capacity of $$C_{DRAM}^{CXL}$$

(where $$C_{DRAM} = C_{DRAM}^{SSD} + C_{DRAM}^{CXL}$$

) that is exposed to the host CPU 10 and includes the system memory space managed by the host OS.

Fusion drive 40 can operate in three distinct modes, NVMe-only, combo-NVMe/CXL, and fused-NVMe/CXL. In one illustrative embodiment, the mode of fusion drive can be selected using mode selector 43, e.g., by an administrator during set-up. In other cases, the mode can be implemented in a predefined manner (e.g., drive 40 can be produced for a particular mode). Regardless, the three modes are described as follows:

1. NVMe-only mode: In this mode, as illustrated in FIG. 4, the fusion drive controller 42 operates as a normal NVMe SSD controller, hence the fusion drive 40 behaves as a standard NVMe SSD, where NVMe protocol directly runs on all the PCIe lanes 50. All the internal DRAM 46 capacity is used for supporting NVMe SSD functions, i.e., $$C_{DRAM}^{CXL} = 0 \text{ and } C_{DRAM}^{SSD} = C_{DRAM}.$$

The host CPU 10 interacts with the fusion drive 40 through the standard NVMe protocol on physical PCIe lanes 50, with all data transfers taking place between the fusion drive and host DRAM as in conventional practice.

Figure 5:
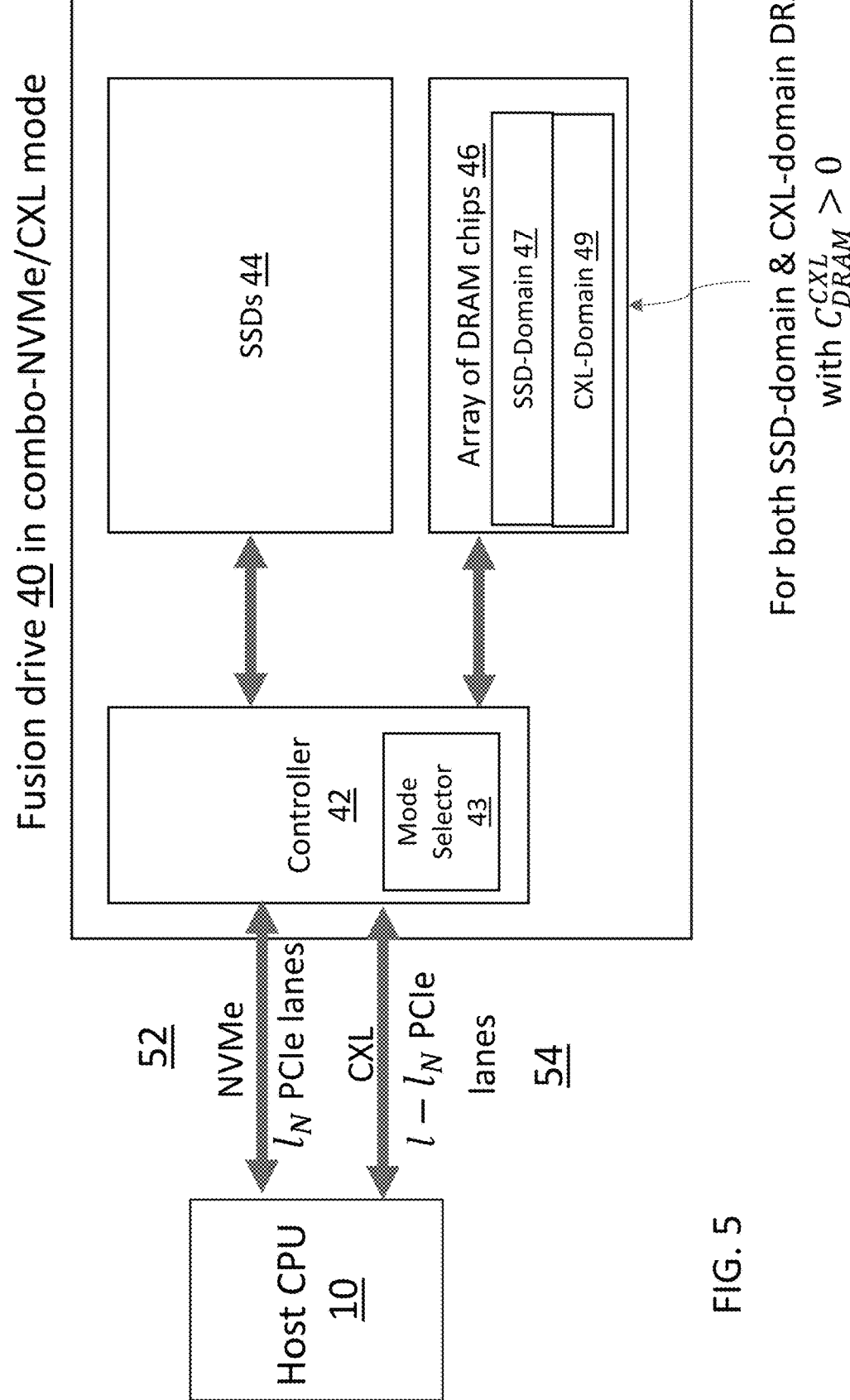
FIG. 5 illustrates a fusion drive operating in the combo-NVMe/CXL mode where NVMe protocol and CXL protocol run on distinct PCIe lanes, according to embodiments.

2. Combo-NVMe/CXL mode: In this mode, as illustrated in FIG. 5, fusion drive 40 divides its total l PCIe lanes into two subsets: a first subset $l_N$ PCIe lanes 52 are used for NVMe protocol, and a second subset $1-l_N$ PCIe lanes 54 are used for CXL protocol. Inside the fusion drive 40, the CXL-domain DRAM 49 capacity is greater than zero, $$C_{DRAM}^{CXL} > 0.$$

By using distinct PCIe lanes, NVMe and CXL operations will not interfere with each other on the PCIe data transfer path. Nevertheless, the aggregated PCIe bandwidth utilization may limited, especially when NVMe and CXL undergo largely different workload intensity.

Figure 6:
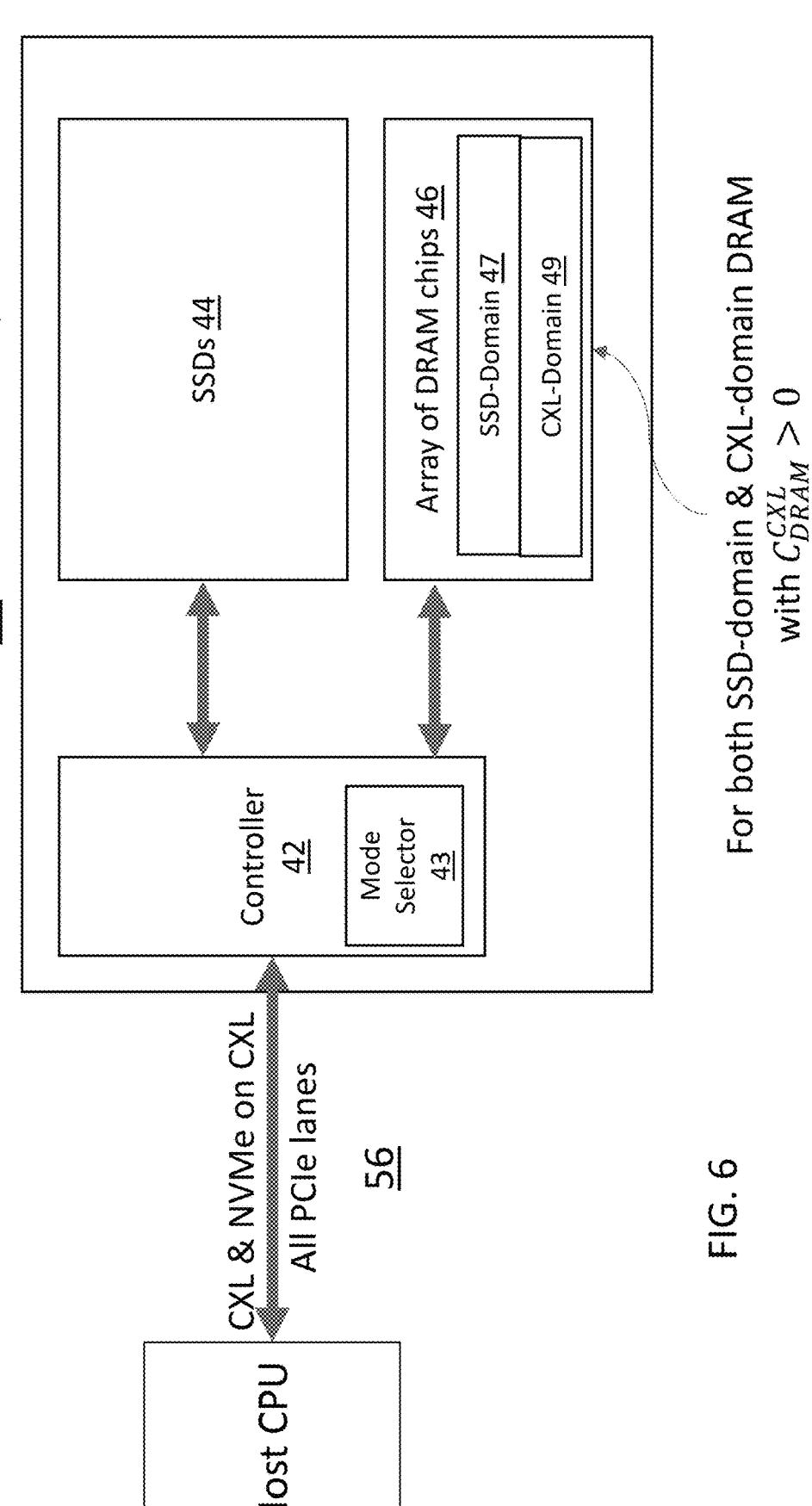
FIG. 6 illustrates a fusion drive operating in the fused-NVMe/CXL mode where NVMe protocol runs over all the PCIe lanes and NVMe protocol runs on top of CXL, according to embodiments.

3. Fused-NVMe/CXL mode: In this mode, as illustrated in FIG. 6, fusion drive 40 devotes all its l PCIe lanes for CXL protocol. NVMe commands are transferred on top of the CXL protocol, and all the data transfer is realized through the CXL data path 56. Inside the fusion drive 40, the CXL-domain DRAM 49 capacity $$C_{DRAM}^{CXL} > 0.$$

By layering NV Me protocol on top of the CXL protocol, the system can maximize the utilization of the aggregated PCIe bandwidth. Nevertheless, NVMe and CXL operations are managed by controller 42 so as to minimize interference with each other.

Given a system with n fusion drives operating in combo-NVMe/CXL mode or fused-NVMe/CXL mode, the entire OS-managed system memory space $$S_{sys} = \{S_{host}, S_{CXL}^1, S_{CXL}^2, \cdots, S_{CXL}^n\}$$

contains n+1 regions: The memory space region $S_{host}$ covers all the host DRAM that are directly connected with host CPU via DDR channels, and each memory space region $$S_{CXL}^i$$

covers the CXL-domain DRAM inside the i-th fusion drive. Recall that $$C_{DRAM}^{CXL}$$

denotes the CXL-domain DRAM capacity inside one fusion drive, hence the memory region $$S_{CXL}^i$$

has the capacity of $$C_{DRAM}^{CXL}$$

in the i-th fusion drive.

Figure 7:
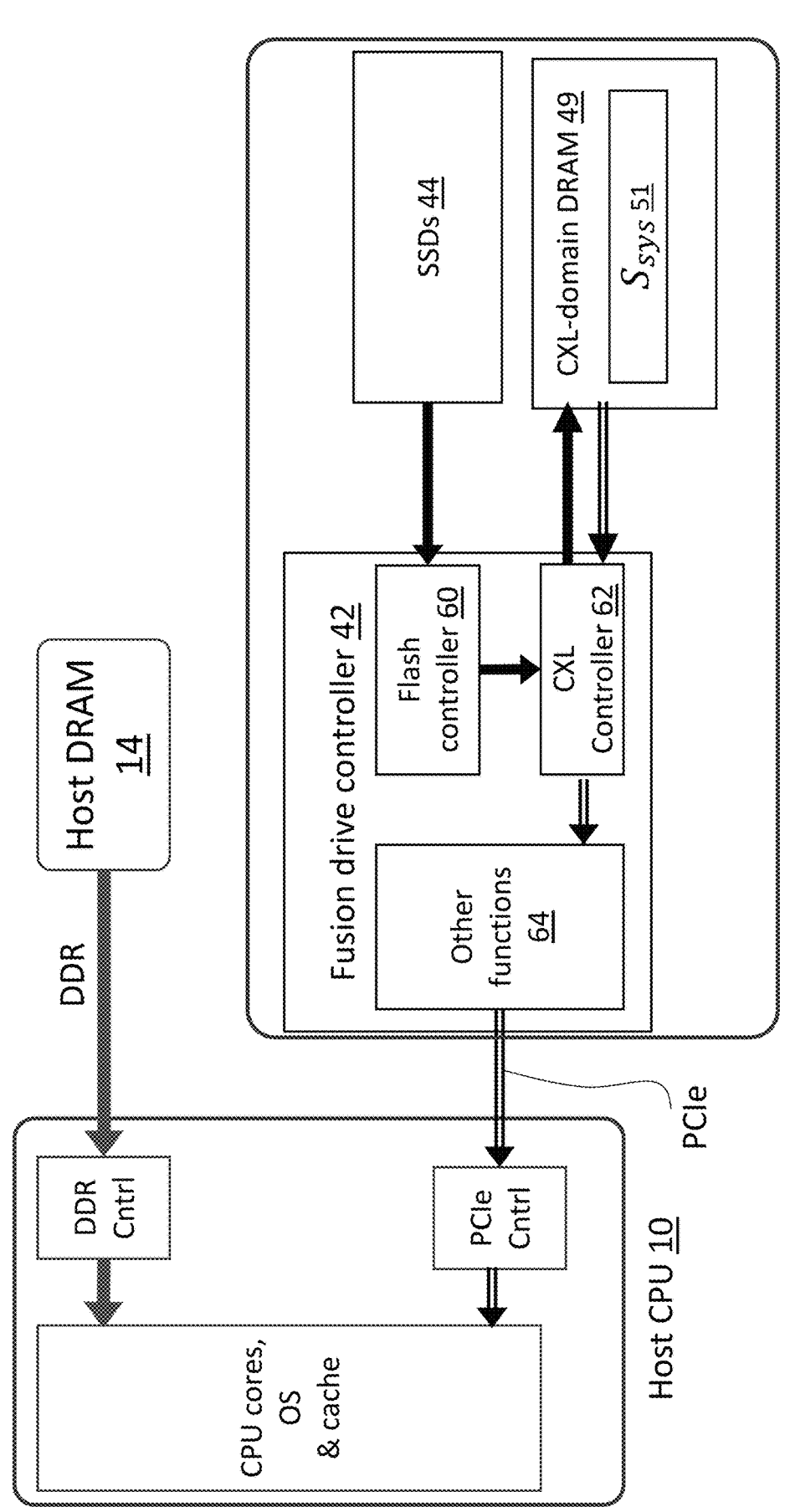
FIG. 7 illustrates the host CPU directly accessing/processing data from fusion drives without consuming host DRAM bandwidth, according to embodiments.

FIG. 7 depicts fusion drive 40 in further detail. In this embodiment, fusion drive controller 42 includes a flash controller 60, a CXL controller 62 and other functions 64 (e.g., mode selector, DRAM partitioner, protocol and communication manager, etc.). As illustrated, when operating in combo-NVMe/CXL mode or fused-NVMe/CXL mode, the fusion drive 40 can directly copy data from its SSDs 44 into its CXL-domain DRAM 49 without going through the host DRAM 14.

When the host CPU 10 reads data from NVMe SSDs 44 (e.g., out of NAND flash memory), the host can allocate a memory block in its OS-managed system memory space $S_{sys}$ 51 as the destination location with the address $A_{dst}$ to which the NVMe SSD returns the data via the flash controller 60 and CXL controller 62. When fusion drive 40 operates in combo-NVMe/CXL mode or fused-NVMe/CXL mode, the fusion drive controller 42 is aware of the memory space $$S_{CXL}^i$$

of its CXL-domain DRAM 49 in the system memory space $S_{sys}$.

Figure 8:
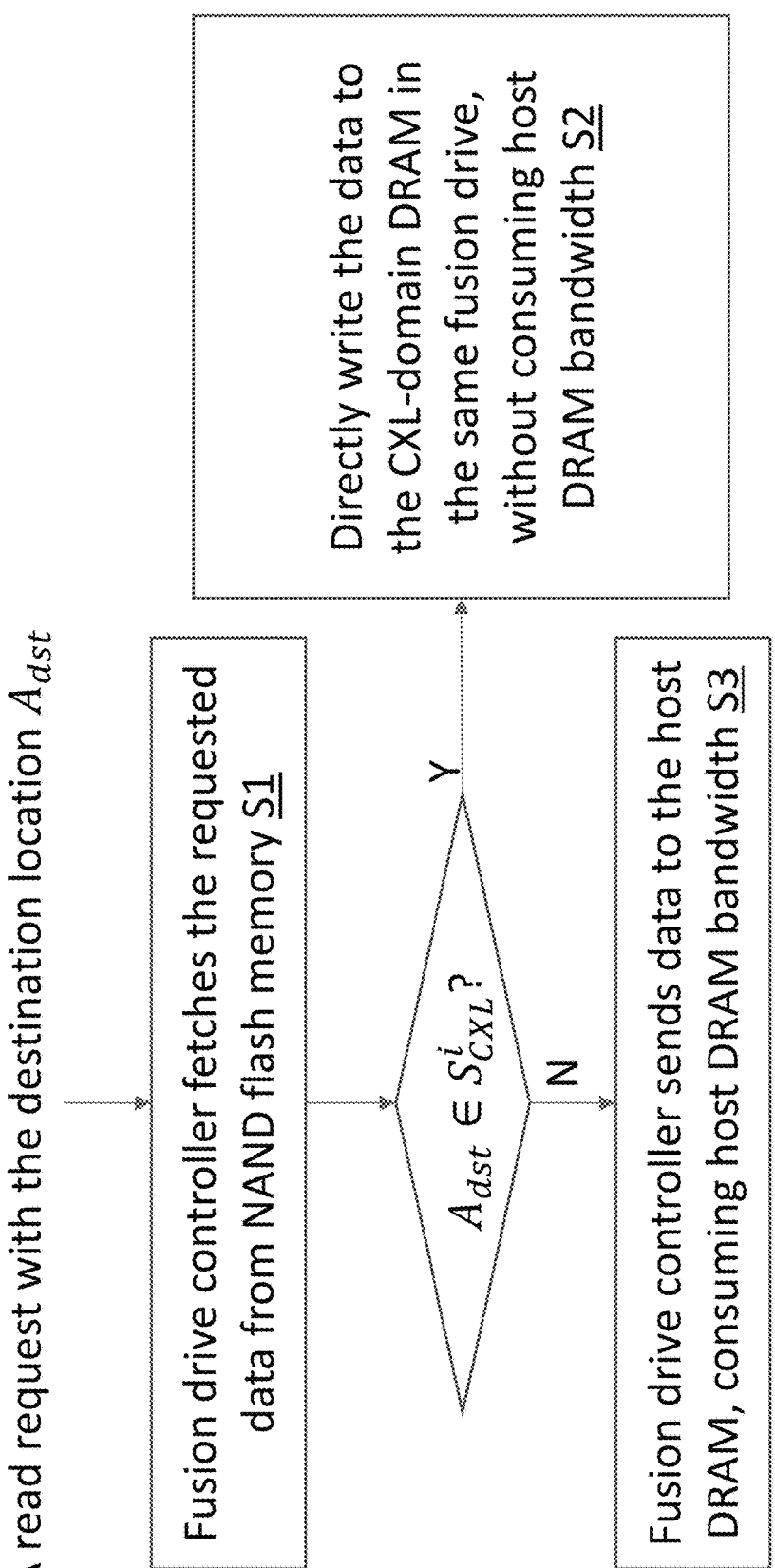
FIG. 8 illustrates a flow diagram of fusion drives serving a read request from host, according to embodiments.

When serving a read request from the host CPU 10, as illustrated in FIG. 8, after fetching the requested data from SSDs 44 at S1, the fusion drive controller 42 first checks whether the destination location $A_{dst}$ belongs to the memory space $$S_{CXL}^i$$

of its CXL-domain DRAM 49, if yes, then the fusion drive controller 42 will directly write the data into its CXL-domain DRAM via the flash controller 60 and CXL controller 62 at S2, otherwise (i.e., the destination location $A_{dst}$ belongs to the memory space region $S_{host}$) the fusion drive controller 42 will send the data to the destination location via the DDR channels of host DRAM 14 at S3.

Figure 9:
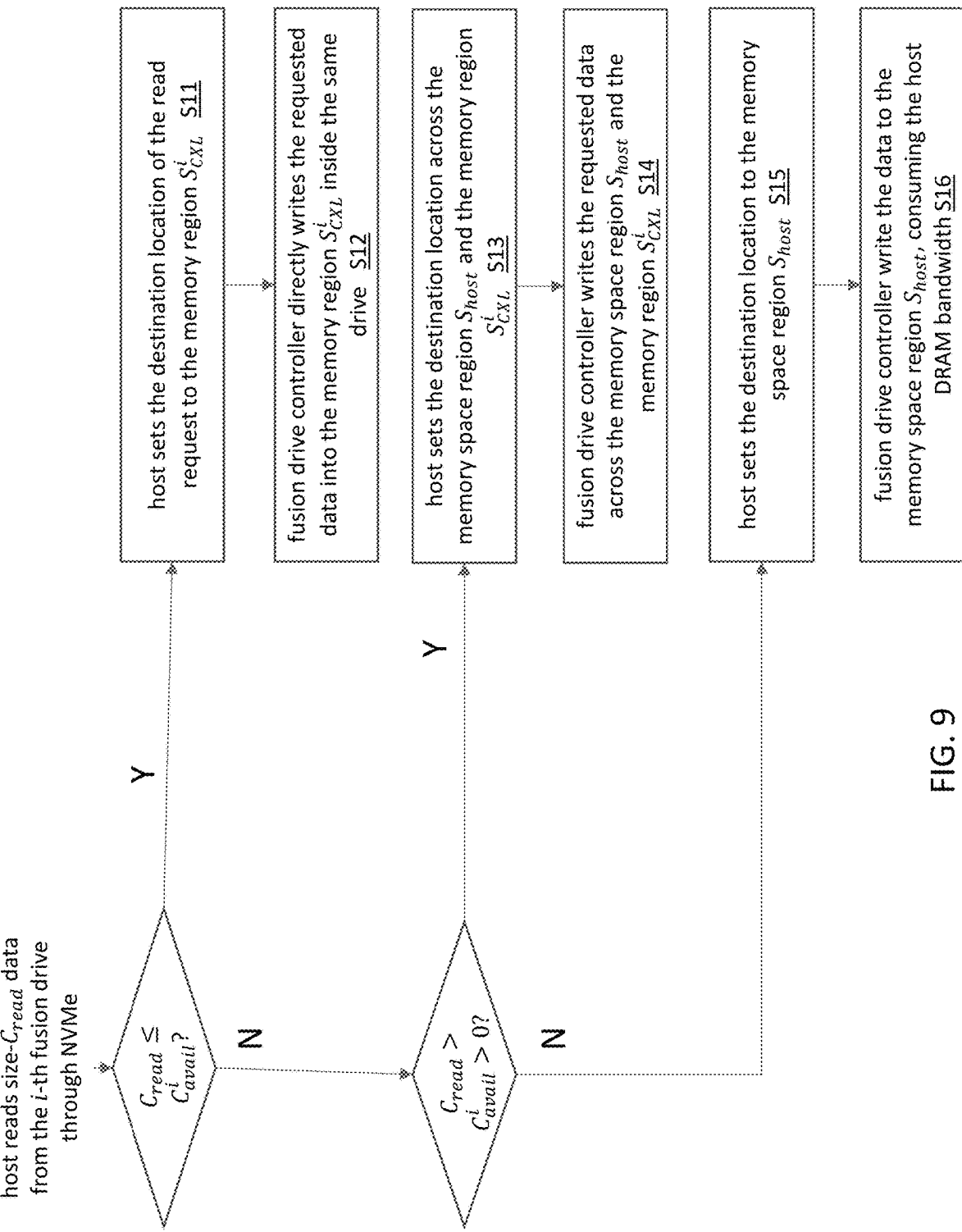
FIG. 9 illustrates a flow diagram of a host setting a destination location of read requests, according to embodiments.

As illustrated in FIG. 9, when fusion drives operate in combo-NVMe/CXL mode or fused-NVMe/CXL mode, the host CPU 10 can perform the following operations to reduce the consumption of host DRAM bandwidth for SSD reads: Let $$C_{avail}^i$$

denote the memory capacity that is still available in the memory region $$S_{CXL}^i.$$

When the host CPU reads size-$C_{read}$ data from the i-th fusion drive through NVMe, we have the following options:

If $$C_{read} \leq C_{avail}^i,$$

then the host CPU will set the destination location belonging to the CXL-domain DRAM 49 of the fusion drive (i.e., set $$A_{dst} \in S_{CXL}^i$$

at S11. When serving this NVMe SSD read request, the fusion drive controller directly writes the requested size-$C_{read}$ data from NAND flash memory into the memory region $$S_{CXL}^i$$

inside the same drive at S12. Then the host can read data from the memory region $$S_{CXL}^i$$

through the CXL protocol. No host DRAM bandwidth is consumed during the entire process.

If $$C_{read} > C_{avail}^i > 0,$$

then the host will set the destination location across both the memory space region $S_{host}$ (covering the host DRAM 14 outside the fusion drive 40) at S13 and the memory region $$S_{CXL}^i$$

(covering the CXL-domain DRAM inside the fusion drive 40) at S14. When serving this NVMe SSD read request, the fusion drive controller writes a portion of the requested data into the memory region $$S_{CXL}^i$$

inside the fusion drive and writes the rest into the memory space region $S_{host}$. The host can then read the data from the memory region $$S_{CXL}^i$$

through CXL protocol and from the memory space region $S_{host}$ through DDR channels.

If $$C_{avail}^i = 0,$$

then the host will set the destination location to the memory space region $S_{host}$ (outside the fusion drive) at S15. When serving this NVMe read request, the fusion drive controller will send the requested data to the memory space region $S_{host}$. The host will read the data from the memory space region $S_{host}$, consuming the host DRAM bandwidth at S16.

Accordingly, to reduce the usage of host DRAM bandwidth, fusion drives should operate in either combo-NVMe/CXL mode or fused-NVMe/CXL mode. To further improve the effectiveness, the capacity of CXL-domain DRAM (i.e., $$C_{DRAM}^{CXL}$$

inside each fusion drive could be increased. However, directly deploying more DRAM chips to increase $$C_{DRAM}^{CXL}$$

results in higher implementation cost and may not be even feasible due to the device form factor limitation. Various solutions are presented herein that can effectively increase the usable capacity of CXL-domain DRAM inside fusion drives without adding extra DRAM chips.

Recall that, given the total DRAM capacity of $C_{DRAM}$ inside one fusion drive, the fusion drive controller partitions DRAM into two domains: (1) SSD-domain DRAM with the capacity of $$C_{DRAM}^{SSD}$$

that is used for managing NAND flash memory and supporting NVMe SSD functions; (2) CXL-domain DRAM with the capacity of $$C_{DRAM}^{CXL}$$

that is exposed to the host and added into the system memory space organized/managed by OS. Given the total DRAM capacity $$C_{DRAM} = C_{DRAM}^{SSD} + C_{DRAM}^{CXL},$$

reducing $$C_{DRAM}^{SSD}$$

will directly increase $$C_{DRAM}^{CXL}.$$

A majority of SSD-domain DRAM capacity $$C_{DRAM}^{SSD}$$

is used to store the flash translation layer (FTL) mapping table. Hence, reducing the size of FTL mapping table will reduce the value of $$C_{DRAM}^{SSD}.$$

Figure 10:
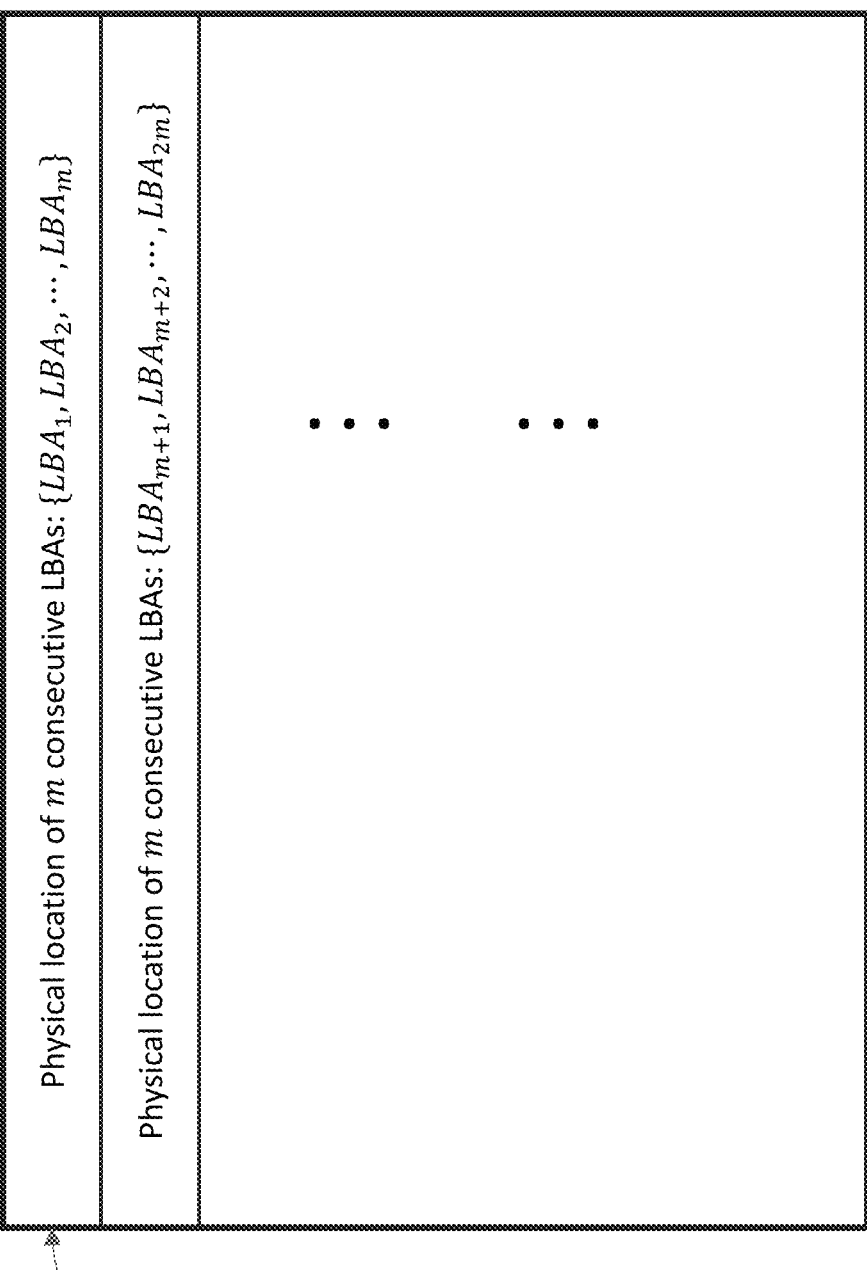
FIG. 10 illustrates an FTL mapping table used for recording the mapping between each group of m consecutive LBAs and the contiguous NAND flash memory physical storage space storing them, according to embodiments.
Figure 11:
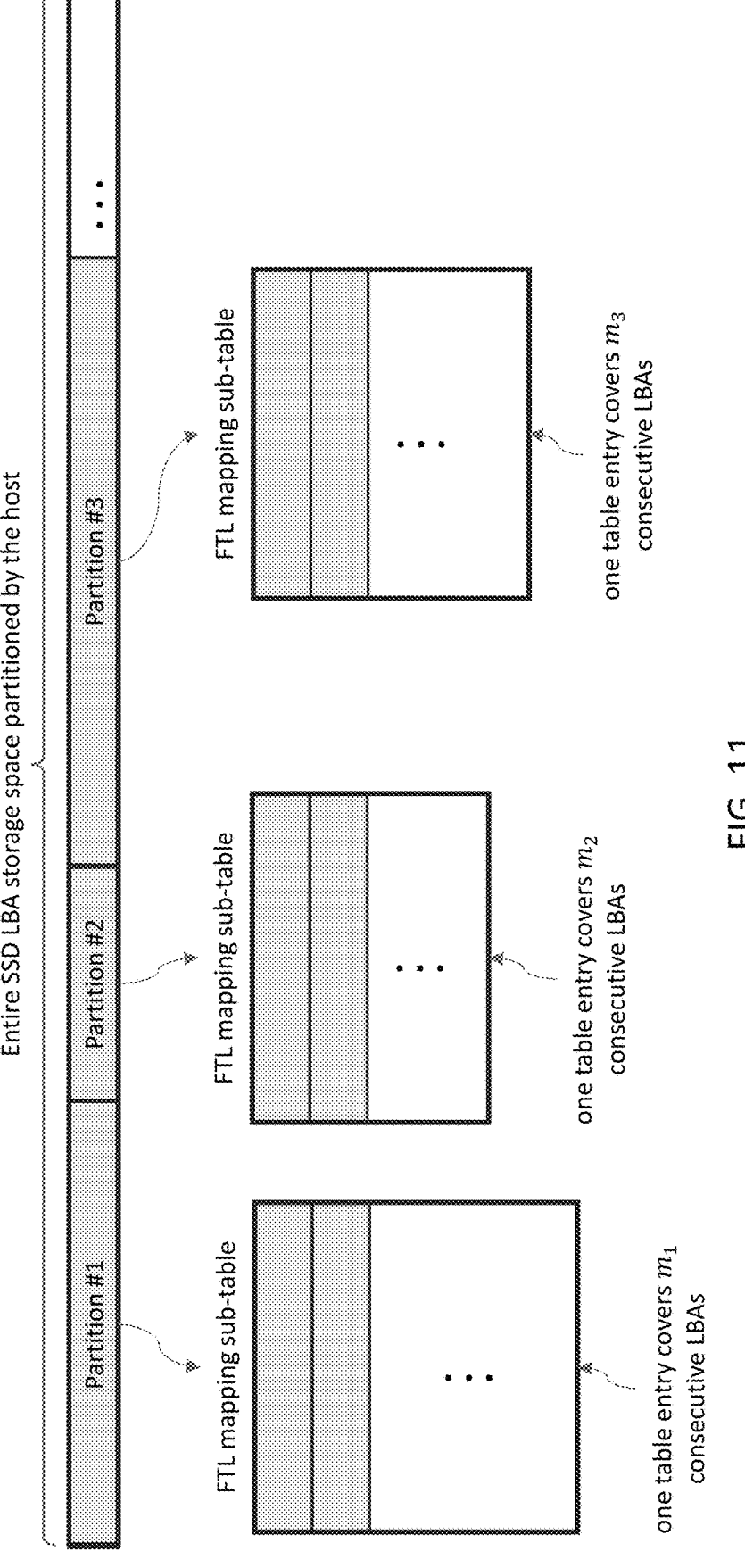
FIG. 11 illustrates a host-partition-assisted FTL mapping table size reduction, where the host explicitly splits the entire LBA space into multiple SSD storage space partitions, and where different partitions correspond to mapping tables with different entry size, according to embodiments.

To serve as NVMe SSDs, fusion drive 40 exposes a contiguous space of logical block addresses (LBA) to the host CPU 10, where each LBA typically spans over 512B or 4 KB storage space. Let $S_{LBA}$ denote the LBA block size (e.g., 512B or 4 KB). As illustrated in FIG. 10, each FTL mapping table entry records the mapping between m consecutive LBAs (e.g., $\{LBA_1, LBA_2, \ldots, LBA_m\}$) and a contiguous NAND flash memory physical storage space that stores these m LBA blocks, where m≥1. Accordingly, as the drive 42 increases the value of m (i.e., one FTL mapping table entry covers more consecutive LBAs), the FTL mapping table contains a smaller number of entries and hence consumes a smaller amount of DRAM capacity. Nevertheless, a larger value of m results in a higher write amplification under random data writes, i.e., to update one LBA data block, the drive needs to re-write all the m consecutive LBA blocks mapped by the same FTL mapping table entry, leading to SSD I/O performance degradation. Fortunately, in many applications (e.g., AI and data analytics), random data writes are relatively infrequent, and the I/O workloads tend to be read-heavy and/or sequential. This opens unique opportunities to reduce the FTL mapping table size, enabling a larger CXL-domain DRAM capacity. Namely, the controller 42 is further configured to dynamically repartition the SSD domain DRAM and CXL-domain DRAM in response to a reconstructing of the mapping table. Accordingly, embodiments include the following two techniques:

1. Host-partition-assisted FTL mapping table size reduction: In this approach shown in FIG. 11, the host CPU 10 partitions (and then repartitions) the entire SSD LBA space into multiple partitions and specifies the value of m for each partition, where different partitions could have different value of m. Different partitions could have (largely) different storage capacity. Accordingly, the FTL mapping table consists of multiple sub-tables #1, #2, #3, etc., where each sub-table corresponds to one partition, as illustrated in FIG. 11. In this way, the host can leverage prior knowledge about how much the data will undergo random small size writes to configure the SSD LBA space partitioning and the value of m for each partition, reducing the total DRAM consumption of SSD FTL mapping table. Because this approach is based on commands from the host CPU 10, this technique demands the explicit involvement/assistance of the host CPU 10.

Figure 12:
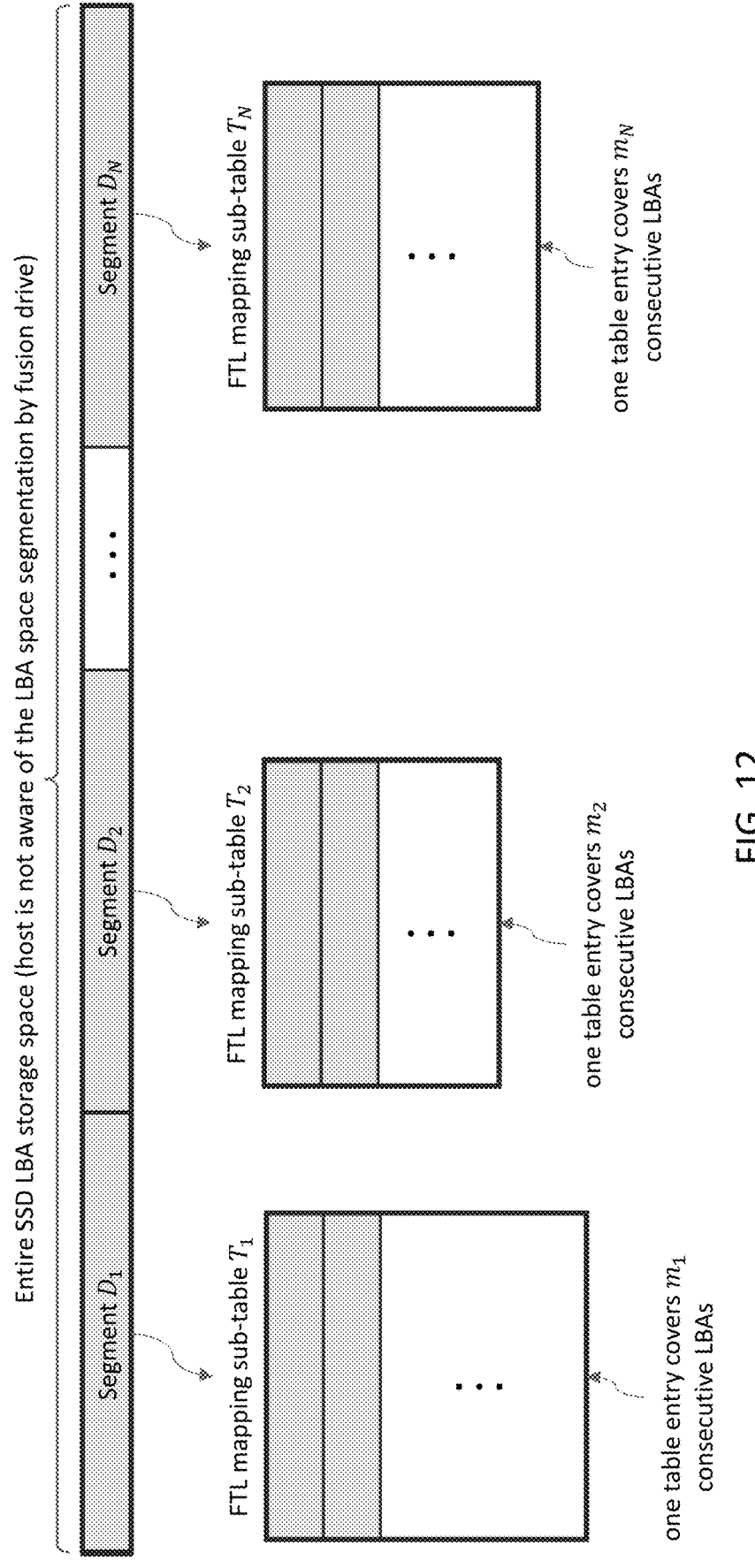
FIG. 12 illustrates a learning-based FTL mapping table size reduction, where the fusion drive dynamically adjusts the mapping table entry size for each storage space segment, transparent to the host, according to embodiments.

2. Learning-based FTL mapping table size reduction: To improve the practical feasibility, this second technique shown in FIG. 12 is based on access characteristics of data and does not need any involvement/assistance from the host CPU 10. In this case, the fusion drive controller, on-the-fly, learns the access characteristics of SSD-resident data, based on which they adaptively adjust the FTL mapping table entry size. This is transparent to the host and hence does not need any assistance from the host, leading to a better practical feasibility. As illustrated in FIG. 12, being transparent to the host, fusion drives internally partition the FTL mapping table into N sub-tables, all the sub-tables $\{T_1, T_2, \ldots, T_N\}$ cover the same amount of LBA storage space, i.e., the entire SSD storage space is partitioned into N equal-size segments $\{D_1, D_2, \ldots, D_N\}$. All the entries in the same sub-table cover the same number of the consecutive LBAs (i.e., the same value of m), and different sub-tables could have different value of m. During the runtime, fusion drive 40 keeps monitoring the data access characteristics over each segment, based on which fusion drive 40 accordingly adjusts the mapping table entry size of each segment. Given the mapping table entry size m, let $\alpha_{WA}(m) \geq 1$ denote the average NAND flash memory write amplification factor within a recent observation time window. Under the same write request size characteristics, $\alpha_{WA}(m)$ will increase as the value of m increases. When m=1 (i.e., each mapping table entry only covers one LBA block), the write amplification factor $\alpha_{WA}(m)$ will reduce to 1. For each storage space segment $D_i$, let $V_{read}$ and $V_{write}$ denote the total data volume of read and write operations within a recent observation time window, Tup and down denote two pre-defined thresholds (where $r_{down} > r_{up}$), and $\beta \geq 1$ denote a pre-defined importance factor of write amplification.

In one illustrative embodiment, fusion drive 40 calculates a metric $$\mu = \frac{(\alpha_{WA}(m))^{\beta} \cdot V_{write}}{V_{read} + V_{write}}.$$

Figure 13:
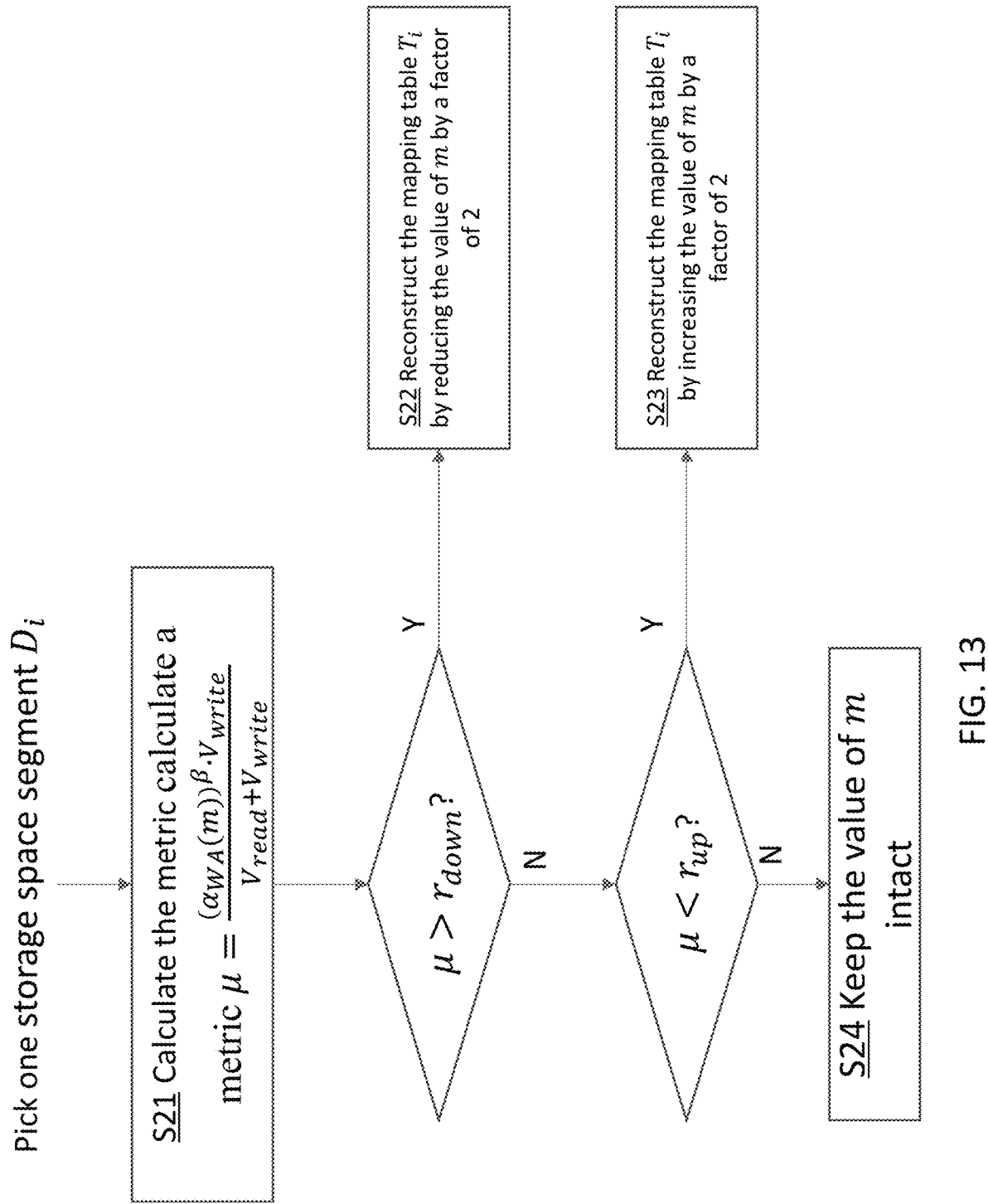
FIG. 13 illustrates a flow diagram of dynamically adjusting the mapping table entry size when using a learning-based FTL mapping table size reduction, according to embodiments.

As illustrated in FIG. 13, for each storage space segment, fusion drive 40 periodically adjusts the setting of m as follows. First a storage space segment Di is selected, and the value μ is calculated at S21.

a. If $\mu > r_{down}$, drive 42 will consider that this segment severely suffers from write amplification due to a large value of m. Accordingly, at S22 drive 42 will reconstruct the mapping table $T_i$ by reducing the value of m by a factor of 2 (i.e., reduce the value of m to m/2).

b. If $\mu < r_{up}$, drive 42 will consider that this segment could afford having a larger value of m without notably hurting the speed performance. Accordingly, at S23 drive 42 will increase the value of m by a factor of 2 (i.e., increase the value of m to 2m).

c. Otherwise (i.e., $r_{up} \leq \mu \leq r_{down}$, drive 42 will simply keep the value of m intact at S24.

It is understood that aspects of the present disclosure may be implemented in any manner, e.g., hardware, computer chips, as a software/firmware program, an integrated circuit board, a controller card, etc., that includes a processing core, I/O, memory and processing logic. Aspects may be implemented in a combination of hardware and software. Aspects of the processing logic may be implemented using field programmable gate arrays (FPGAs), application specific integrated circuit (ASIC) devices, and/or other hardware-oriented systems.

Aspects also may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on a host computer, partly on a host computer, on a remote computing device (e.g., a memory card) or entirely on the remote computing device. In the latter scenario, the remote computing device may be connected to the host computer through any type of interface or network. In some embodiments, electronic circuitry including, for example, program-mable logic circuitry, field-programmable gate arrays (FPGA), or programmable logic arrays (PLA) may execute the computer readable program instructions by utilizing state information of the computer readable program instructions to control electronic circuitry in order to perform aspects of the present disclosure.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A memory drive, comprising:
a plurality of solid-state devices (SSDs);
a plurality of dynamic random-access memory (DRAM) devices; and
a controller configured to implement a data management process that includes:
partitioning the DRAM devices into SSD-domain DRAM having a mapping table and a Compute Express Link (CXL)-domain DRAM having a system memory space that is directly accessible by a host central processing unit (CPU); and
processing read requests from the host CPU for data in the SSDs, including writing requested data into the system memory space of the CXL-domain DRAM, and then writing the requested data from the CXL-domain DRAM to the host CPU using a CXL transport protocol.

2. The memory drive of claim 1, wherein the memory drive is coupled to the host CPU via a plurality of Peripheral Component Interconnect Express (PCIe) lanes and the controller is further configured to allocate a first subset of PCIe lanes to operate with the CXL transport protocol and allocate a second subset of PCIe lanes to operate with an NVMe transport protocol.

3. The memory drive of claim 2, wherein writing the requested data to the host CPU using the CXL transport protocol occurs via the first subset of PCIe lanes.

4. The memory drive of claim 3, wherein processing read requests further includes first determining whether the system memory space of the CXL-domain DRAM has space to handle the requested data, and in response to determining there is not enough system memory space, writing at least a portion the requested data directly from the SSDs to the host CPU via the second subset of PCIe lanes with the NVMe transport protocol.

5. The memory drive of claim 1, wherein the memory drive is coupled to the host CPU via a plurality of Peripheral Component Interconnect Express (PCIe) lanes and the controller is further configured to overlay an NVMe transport protocol onto the CXL transport protocol for all of the PCIe lanes.

6. The memory drive of claim 5, wherein writing the requested data to the host CPU includes using the CXL transport protocol.

7. The memory drive of claim 6, wherein processing read requests further includes first determining whether the system memory space of the CXL-domain DRAM has space to handle the requested data, and in response to determining there is not enough system memory space, writing at least a portion of the requested data directly from the SSDs to the host CPU via using the NVMe transport protocol.

8. The memory drive of claim 1, wherein the controller is further configured to dynamically repartition the SSD domain DRAM and CXL-domain DRAM.

9. The memory drive of claim 8, wherein the SSD domain DRAM and CXL-domain DRAM are dynamically repartitioned in response to a reconstructing of the mapping table.

10. The memory drive of claim 9, wherein the mapping table is reconstructed based on access characteristics of data in SSDs.

11. The memory drive of claim 9, wherein the mapping table is reconstructed based on commands from the host CPU.

12. A method for implementing a data management process in a memory drive that includes a plurality of solid-state devices (SSDs) and a plurality of dynamic random-access memory (DRAM) devices, the method comprising:

partitioning the DRAM devices into SSD-domain DRAM having a mapping table and a Compute Express Link (CXL)-domain DRAM having a system memory space that is directly accessible by a host central processing unit (CPU);

receiving a read request from a host CPU for data in the SSDs;

writing requested data into the system memory space of the CXL-domain DRAM; and writing the requested data from the CXL-domain DRAM to the host CPU using a CXL transport protocol.

13. The method of claim 12, wherein the memory drive is coupled to the host CPU via a plurality of Peripheral Component Interconnect Express (PCIe) lanes, and wherein a first subset of PCIe lanes are allocated to operate with the CXL transport protocol and a second subset of PCIe lanes are allocated to operate with an NVMe transport protocol.

14. The method of claim 13, wherein writing the requested data to the host CPU using the CXL transport protocol occurs via the first subset of PCIe lanes.

15. The method of claim 14, wherein processing the read request further includes first determining whether the system memory space of the CXL-domain DRAM has space to handle the requested data, and in response to determining there is not enough system memory space, writing at least a portion the requested data directly from the SSDs to the host CPU via the second subset of PCIe lanes with the NVMe transport protocol.

16. The method of claim 12, wherein the memory drive is coupled to the host CPU via a plurality of Peripheral Component Interconnect Express (PCIe) lanes which is configured to overlay an NVMe transport protocol onto the CXL transport protocol for all of the PCIe lanes.

17. The method of claim 16, wherein writing the requested data to the host CPU includes using the CXL transport protocol.

18. The method of claim 17, wherein processing the read request further includes first determining whether the system memory space of the CXL-domain DRAM has space to handle the requested data, and in response to determining there is not enough system memory space, writing at least a portion of the requested data directly from the SSDs to the host CPU via using the NVMe transport protocol.

19. The method of claim 12, further comprising dynamically repartition the SSD domain DRAM and CXL-domain DRAM.

20. The method of claim 19, wherein the SSD domain DRAM and CXL-domain DRAM are dynamically repartitioned in response to a reconstructing of the mapping table.

* * * * *